April 15, 1969
K. B. KAISER
3,438,288
BEARING SUPPORT FOR TOOL SPINDLES
Filed May 1, 1967
Sheet 1 of 3
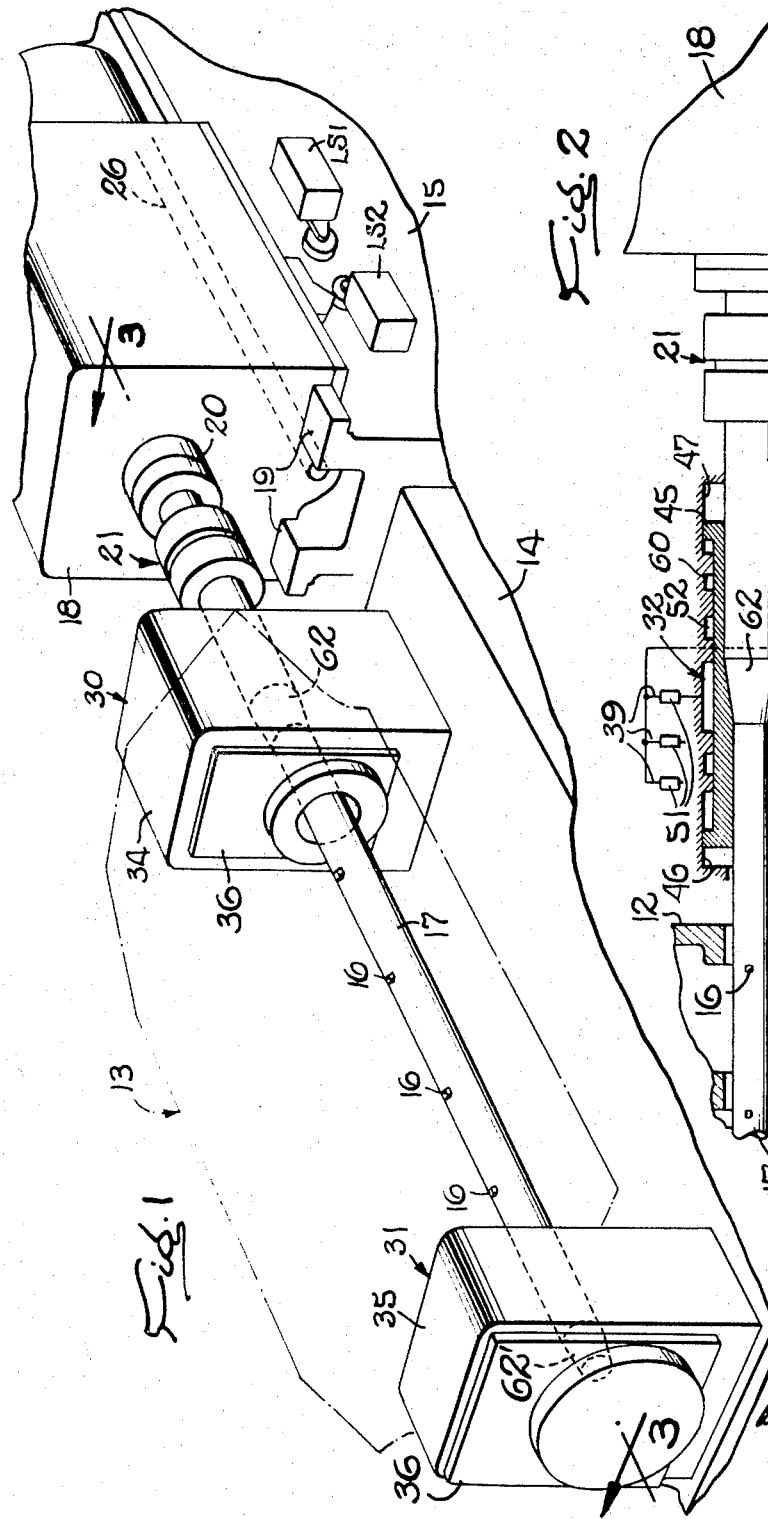
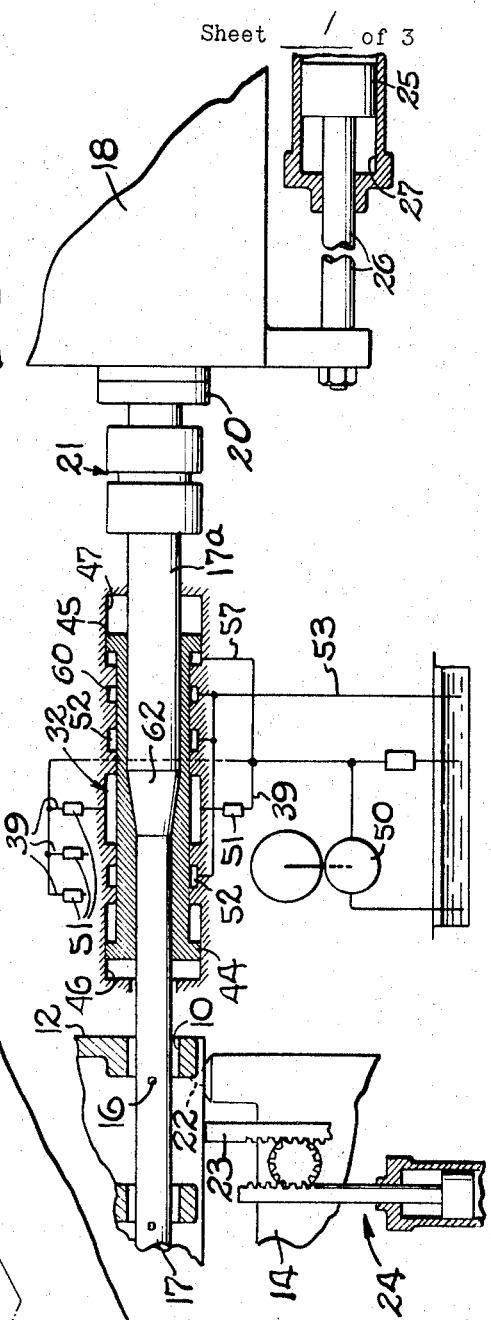
INVENTOR
Karl B. Kaiser
By Wolfe, Hubbard,
Voit & Osann
ATTORNEYS April 15, 1969     K. B. KAISER     3,438,288
BEARING SUPPORT FOR TOOL SPINDLES
Filed May 1, 1967     Sheet 2 of 3
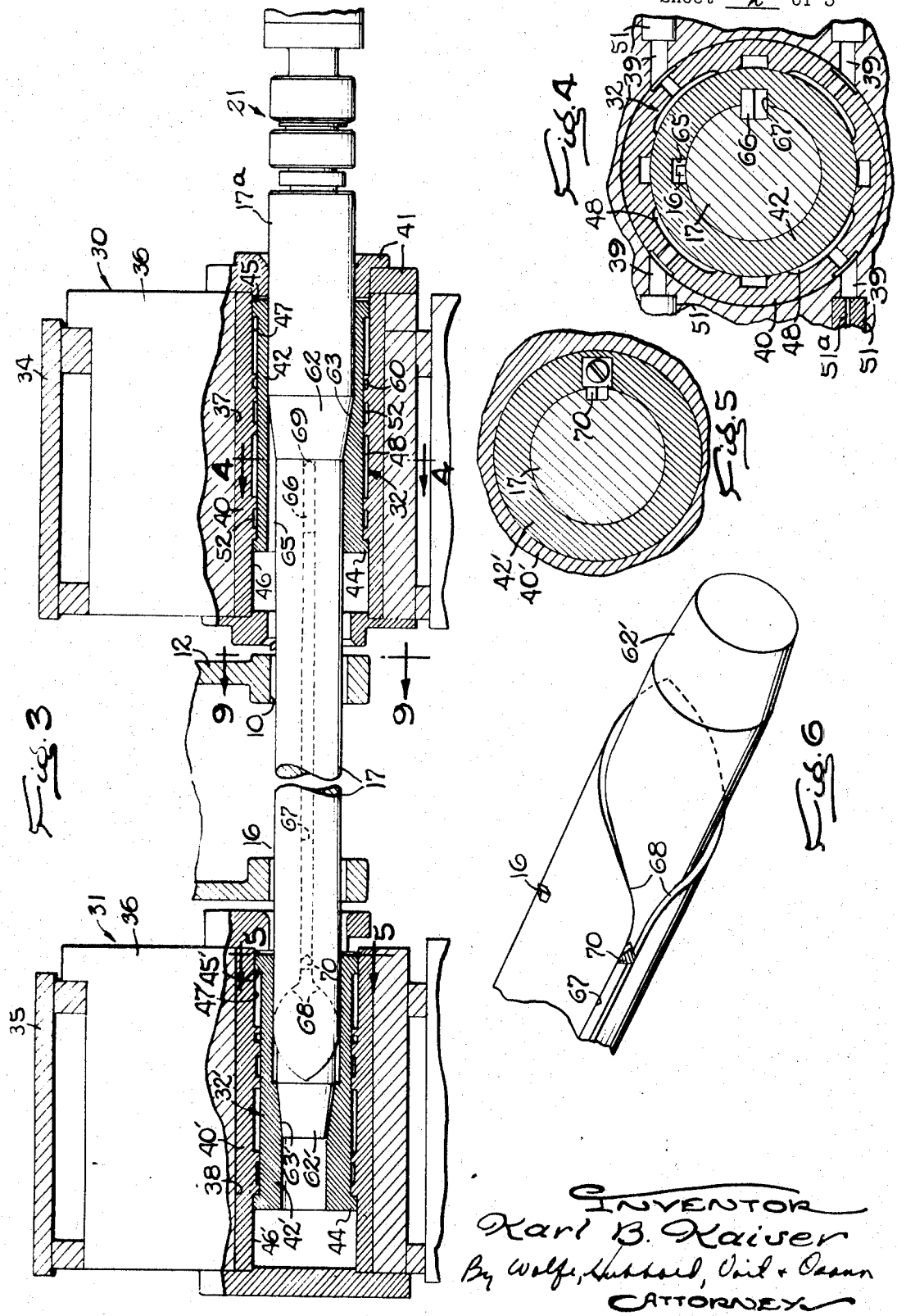
INVENTOR
Karl B. Kaiser
By Wolfe, Hubbard, Voit & Osann
ATTORNEY

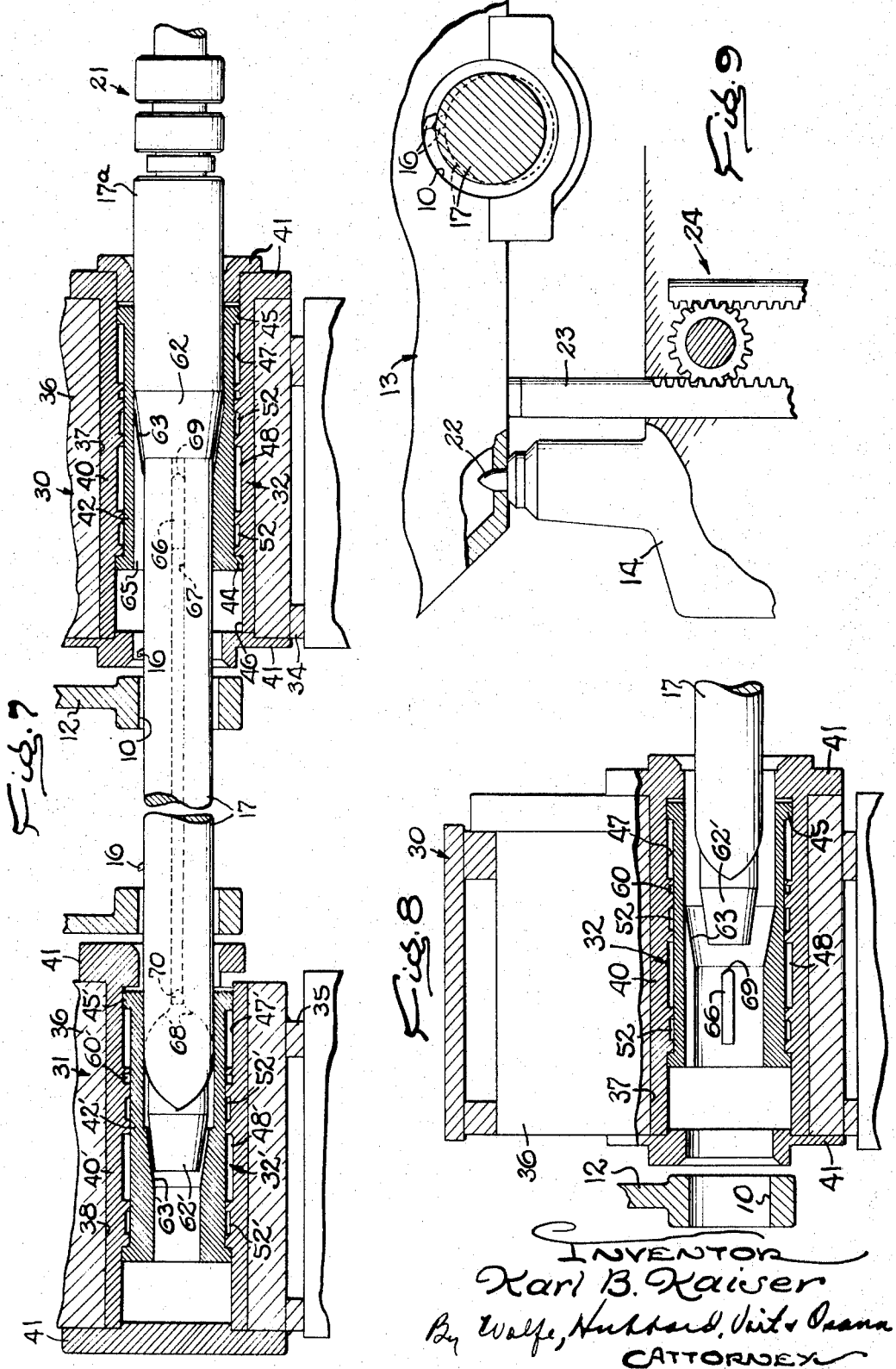

United States Patent Office 3,438,288
Patented Apr. 15, 1969

3,438,288
BEARING SUPPORT FOR TOOL SPINDLES
Karl B. Kaiser, Rockford, Ill., assignor to The Ingersoll Milling Machine Company, Rockford, Ill., a corporation of Illinois
Filed May 1, 1967, Ser. No. 635,149
Int. Cl. B23b 29/02, 39/00; B23c 7/00
U.S. Cl. 77—56          11 Claims

ABSTRACT OF THE DISCLOSURE

A rotary spindle carrying boring teeth projects cantilever fashion from a power reciprocated head which is advanced rapidly to move the spindle through an inboard bearing bushing and the work bores and into an outboard bearing bushing to position cutter teeth adjacent the holes to be bored in a workpiece. In reaching this position, conical tapers on the exterior of the spindle seat in complemental tapers on the interior of the bushings thus coupling the two rigidly and automatically for rotation and axial shifting in unison during the continued advance of the head to feed the tools through the work. The bushings are mounted on the work support within stationary sleeves which contain the pads of hydrostatic bearings that allow for rotation and shifting of the bushings while supporting the spindle precisely after the coupling and during the boring.

Background of the invention

This invention relates to machine tools such as boring machines in which a head carrying a projecting tool spindle is advanced usually at a rapid rate, to project the spindle through one or more bearing supports and recesses in the workpiece to bring a tool into operative position for effecting the machining as the head is fed forwardly. An application of Frederick J. Kampmeier and Earnest Y. Seborg, Ser. No. 634,957, filed May 1, 1967, discloses a machine tool of this character in which the spindle is advanced through axially spaced bearing bushings which are supported precisely for rotation and limited axial shifting by hydrostatic bearings and which become coupled automatically and rigidly to the spindle near the end of the approach movement thus taking up clearances and rendering the hydrostatic bearings operative to support the spindle in the machining of the workpiece during which the bushings are shifted axially with the spindle.

Summary of the invention

The present invention provides a machine tool of the above character having an improved mechanism for automatically coupling the spindle and bearing bushing together as the spindle approaches working position. The coupling is effected entirely mechanically in the axial advance of the spindle by the seating of a taper on the spindle in a socket of complemental taper on the interior of the hydrostatically supported bearing bushing. Thus coupled, the bushing rotates and shifts axially with the tool head as the advance of the latter is continued to feed the tools through the work. The tapers disengage automatically as the head is retracted and the bushing is biased back to starting position.

Brief description of the drawings

FIGURE 1 is a fragmentary perspective view of a boring machine embodying the novel features of the invention.

FIG. 2 is a schematic view of part of the hydraulic circuitry.

FIG. 3 is a fragmentary section taken on the line 3—3 of FIG. 1.

FIGS. 4 and 5 are sections taken along the lines 4—4 and 5—5 of FIG. 3.

FIG. 6 is a perspective view of the free end of the spindle.

FIGS. 7 and 8 are similar to FIG. 3 but showing different positions of the spindle.

FIG. 9 is a fragmentary section taken along the line 9—9 of FIG. 3.

Description of the preferred embodiment

For purposes of illustration, the invention is shown in the drawings incorporated in a machine tool of the type commonly used for finish boring the cam and crankshaft bearing holes 10 in the crosswebs 12 of an engine block 13 while the latter is secured to and located accurately in a fixture 14 on a bed structure 15. Boring of the crankshaft holes 10 is effected by short teeth 16 spaced along and projecting radially from a tool spindle or bar 17 projecting cantilever fashion from a head 18 which is supported by the bed to slide back and forth along ways 19. The tool spindle is alined with and supported through the medium of a floating tool holder 21 mounted on the outer end of a drive spindle 20 which is journaled in the head 18 to aline the axes of the tool spindle and the holes 10 as shown in FIG. 7 when the workpiece is in boring position. The holder 21, which may be a standard Ziegler holder, allows for limited transaxial floating of the tool spindle to compensate for slight misalinement between the tool spindle and bearing bushings later to be described.

Conventional means (not shown) operates after completion of each boring operation to stop the rotation of the spindle 17 with each tooth 16 in the predetermined upright position shown in FIGS. 1, 4 and 9. While the boring bar is being projected through the rough holes and during retraction from the finished holes, the fixture is shifted vertically to offset the bores 10 along the radius of the positioned tooth and to the position shown in phantom in FIG. 9, the cutter teeth thus being adapted to pass through the hole walls without contact during the advance and retraction of the spindle. After being loaded into the fixture, a workpiece, while engaging dowels 22 (FIGS. 2 and 3) is supported by plungers 23 adapted to be raised and lowered by a suitable actuator 24 activated at proper times in the machine cycle.

The spindle is driven at proper speed by an electric motor in the head 18 and the latter is advanced and retracted by a suitable power actuator which may, as shown, be of the hydraulic type comprising a piston 25 having a rod 26 secured to the head and slidable in a cylinder 27 secured to the bed. Conventional mechanism (not fully shown) is provided for controlling the flow of fluid to opposite ends of the cylinder to advance and retract the tool head 18 in an automatic cycle including first advancing the spindle and tools rapidly from the retracted position (FIG. 8) to the position shown in FIG. 3, then continuing the advance of the head at a slower feed rate to effect the boring, and finally retracting the spindle rapidly out of the workpiece to the starting position. Such control of the head actuator may be effected through conventional circuitry by a switch LS1 actuated when the head completes the rapid approach (FIG. 3), a switch LS2 which is actuated when the boring of the work holes is completed, and a switch which interrupts the rapid return of the head in the starting position. With the spindle retracted, the work may be unloaded from the fixture and another piece placed thereon.

In the rapid advance, the spindle 17 is projected through an inboard bearing support 30, the work holes 10 and into an outboard support 31. These supports include casings 34 and 35 rigidly secured to and upstanding from the top of the bed 15 at opposite ends of the fixture 14 and enclosing and welded to solid blocks 36 which are formed with bores whose walls 37 and 38 are closely concentric with the axis of the spindle. The inboard bearing support includes a sleeve 40 which extends through and is telescoped closely within the bore 37 and is fixed thereon by abutting caps 41 secured against the ends of the block 36. Within the sleeve is a bushing 42 which is supported by a hydrostatic bearing 32 for axial shifting relative to the sleeve, which receives the somewhat enlarged inner end portion 17a of the tool spindle with ample sliding clearance, and which becomes coupled to this spindle for the boring operation. To accommodate the full range of feeding of the spindle during the boring, outturned flanges 44, 45 at opposite ends of the bushing are slidable with narrow clearances within internal cylindrical end portions 46 and 47 of the sleeve.

The hydrostatic bearing is constructed in accordance with well known design techniques and herein comprises four pressure pads supplied with oil under high presure, for example 1000 p.s.i., each pad comprising a rectangular chamber 48 formed in the inner wall of the sleeve 40 and opening toward the outer cylindrical surface of the bushing. A continuous flow of oil at substantially constant pressure from the outlet of a high pressure pump 50 is delivered to the pads through individual branch passages 39 in the block 36 each including a compensating element 51 in the form of an orifice 51a (FIG. 4) whose diameter, for example, .025 of an inch, may be fixed or, if desired, variable to provide a constant pressure drop. The orifice size is correlated with the pad pressure and the sill clearances, for example .0025 of an inch, around the pad and between the opposed walls of the sleeve and bushing. The arrangement is such that flow of pressure fluid to the pads balances the escape of fluid outwardly through the laminar flow passages or clearances. The escaping fluid collects in annular grooves 52 in the sleeve and flows to the drain line 53 through passages in the block 36.

The bushing thus mounted is supported rigidly by the oil in the pads but floats thereon as permitted by the clearances at the flanges 44, 45 and automatically adjusts for and accommodates changes in radial loading in the manner well understood in the hydrostatic bearing art. Thus, the bushing, after coupling to the tool spindle, is always held centered precisely within the sleeve in spite of fluctuating radial loads that are imposed on the tool spindle during the boring.

Provision is made for continuously urging the bushing 42 axially and toward the head 18 to a position which, when the spindle is retracted as shown in FIG. 8, is determined by abutment of the bushing end and the end cap 41. For this purpose, the bushing flange 45 is utilized as a piston slidable in the cylinder 47 which communicates continuously through a line 57 with the outlet of the pump. Any fluid leaking along the cylinder toward the hydrostatic bearing escapes to the drain line through an annular passage 60 between the sleeve and the bushing. The biasing force exerted on the piston 45 is easily overcome in the advance of the head after the spindle becomes coupled to the bushing.

The construction of the outboard bearing support 31 for receiving the free end of the spindle near the end of the rapid approach movement and supporting the same during the boring is essentially the same as that of the inboard bearing support 30 and accordingly, the corresponding parts are indicated by the same but primed reference numerals. As before, the support includes a stationary sleeve 40' fixed in the block 36 and a bushing 42' supported within the sleeve by a hydrostatic bearing 32' and slidable axially against a hydraulic biasing force exerted on a piston 45'. That portion 17a of the spindle which is disposed in the inboard bushing 42 during the boring operation is made somewhat larger than combined diameter of the rest of the spindle and each tooth 16 so that substantially the full length of the spindle may be retracted through the bushing 42 and beyond the inboard end of the workpiece as shown in FIG. 8.

In accordance with the persent invention, mechanical coupling of the spindle to the bushings 42 and 42' is effected automatically in the movement of the head 18 by the abutting engagement and accurate seating at the end of the rapid approach of complemental tapers 62, 62' and 63, 63' formed on the exterior of the spindle and the interior of the bushings at the inner and outer or free end of the spindle. The tapers are conical surfaces having cone angles of about ten degrees and machined precisely concentric with the axes of the bushing and spindle. The bushing tapers 63, 63' which are substantially shorter than the bushings, are disposed about midway between the ends of the bushings 42, 42' and approximately in the planes of the hydrostatic bearings 32, 32'. The taper 62 converges in the direction of advance of the tool head starting at the outer end of the larger end portion 17a of the spindle. The taper 62' is at the free end of the spindle and converges in the same direction as but is smaller in diameter than the taper 62.

The axial spacing of the tapers 62, 62' along the spindle is equal to the spacing of the bushing tapers 63, 63' so that in the advance of the head, the tapers of the two pairs will come into abutment substantially simultaneously in the advance of the tool head. Exact simultaneous seating is not necessary however since the bushing tapers 63 and 63' are biased by their individual hydraulic servos in a direction opposite to the advance of the spindle.

By the seating of the spindle tapers 62, 62' within the tapered sockets 63, 63' of the bushings 42, 42' the spindle is centered precisely relative to the bushing and coupling rigidly and frictionally to the bushings, the coupling being maintained under the biasing pressures exerted on the bushing pistons 45, 45'. With the spindle thus coupled, the bushings are utilized as a medium for rendering the hydrostatic bearings 32 and 32' effective in supporting the spindle during the relative short further advance of the spindle required for the boring. Since the coupling tapers may be formed with great accuracy and precisely concentric with the axes of the spindle and bushings, the preciseness of the support attainable through the use of the hydrostatic bearings is preserved and yet the latter are not called upon to accommodate the usually long rapid approach and return movements of the spindle.

When, as here, the smaller end of the taper 63 is of smaller radius than the tips of the cutter teeth 16, the tapered and outer end portions of the bushing 42 are formed with an open-ended slot 65 which is wider than the teeth and deep enough (see FIG. 4) to allow the teeth to pass through during the advance and retraction of the spindle. Thus, the slot is located angularly so as to be alined with the teeth 16 in the upright position in which the teeth are disposed after interruption of the rotation of the spindle by conventional mechanism within the head 18 following complete boring of the holes 10.

The invention also contemplates the provision of positively acting means for insuring proper alinement of the cutter teeth and the bushing slot 65 at all times. Herein, this means includes a key 66 of square cross-section extending along and projecting inwardly from the inner wall of the bushing 42 beyond the taper 63. This key fits loosely in an outwardly opening and open-ended slot 67 which extends along substantially the full length of the spindle between the tapers 62, 62'. Near the free end of the spindle the opposed walls of the slot flare apart as indicated at 68 and thus are adapted for engagement with the pointed end 69 of the key 66 to utilize the advance of the tool head in camming the spindle angularly to aline the teeth 16 with the bushing slot 65 if the two are out of proper alinement at the start of the rapid advance of the spindle from the retracted position shown in FIG. 8.

The key remains in the slot 67 through the advance of the spindle and thus serves to maintain the spindle and the bushing 42 coupled together positively for rotation in unison within the hydrostatic bearing 32. The cam surfaces 68 on the spindle behind the taper 62' are utilized to effect similar positive coupling of the spindle and the outboard bushing 42'. For this purpose, a similar key 70 is rigid with and projects inwardly from the interior of the bushing 42' near the inner end thereof. In this position, the key is adapted to engage one of the surfaces 68 on the spindle near the end of rapid approach movement and be guided into the slot 67 thus coupling the bushing and spindle together longitudinally.

With the construction above described, it will be apparent the bushings 42, 42' will always be held in proper position relative to the spindle and will be coupled positively thereto during the boring of the holes 10 by the teeth. In each machine cycle, the head is advanced, usually at a rapid rate, from the retracted position shown in FIG. 8 thus projecting the spindle through the bushing 42, the teeth 16 passing through the slot 65. Near the end of the approach, the free end of the spindle enters the bushing 42' and both spindle tapers entering the bushing tapers as shown in FIG. 7. Then as the advance continues and the teeth come close to the holes to be bored, the spindle tapers 62, 62' become seated fully in the bushing sockets 63, 63' thus effecting the desired rigid coupling and precise centering of the spindle within the hydrostatically supported bushings.

About this time, the rapid advance of the spindle is terminated in response to the actuation of switch LS1 which also controls the ensuing continued advance of the head at a slow feed rate during which the teeth 16 engage the work and finish bore the holes 10. In the boring, the tapers 62, 62', 63, 63' remain seated under the force of the hydraulic servos 45, 47, 45', 47' with the spindle positively coupled to the bushings 42, 42' by the keys 66, 70 then disposed in the spindle slot 67. Upon completion of the boring and in response to closure of LS2, the feed is terminated and the head actuator is energized to initiate rapid return of the head during which and after retraction of the bushings by their biasing forces, the tapers 62, 62' are withdrawn from the sockets 63, 63' thus disconnecting the spindle from the bushings.

It is important to note that the couplings with mating tapers respond entirely mechanically to the movements of the tool head and do not require separate actuators or controls for engagement and disengagement. The couplings are engaged automatically when the advancing spindle reaches a predetermined position and disengage in reverse movement or retraction of the spindle leaving the bushings supported by the hydrostatic bearings which are required to accommodate only the short range of spindle movement needed for the boring.

In machine tools of the type illustrated, it is desirable to support the spindle by both the inboard and outboard bearing supports 34 and 35 described. For machining other types of workpieces, only one such bearing support will be required and this may be located either at the inner or the outer end of the spindle or at both ends like the present supports 30 and 31. Also, the invention is applicable to machine tools in which the rapid approach, feed and return are effected by moving the work support instead of the tool head as above described. Therefore, reference in the claims to movement of the tool spindle is intended to include and cover such obvious alternative.

I claim:

1. In a machine tool, the combination of, two supports mounted for relative movement along a straight path, a power rotated spindle mounted cantilever fashion on the movable one of said supports and projecting therefrom along said path, a bushing for receiving said spindle in telescoped relation, means on the other support providing a hydrostatic bearing surrounding said bushing and supporting the same for rotation about and for axial movement along a precisely located axis substantially coincident with the axis of said spindle, mechanism for advancing said movable support along said path to approach a tool on said spindle to a workpiece, move the spindle axially within said bushing, and then continue such advance for machining the workpiece, and complemental conical tapers on the exterior of said spindle and the interior of said bushing converging in the direction of said movable support advance and positioned to come into firm abutting engagement during such advance and remain seated during said continued advance and thereby maintain the spindle and bushing coupled together rigidly for rotation and shifting in unison within said hydrostatic bearing.

2. The combination defined in claim 1 including means biasing said bushing in a direction opposite to said advance to allow for axial shifting of the bushing with the spindle after the seating of said tapers and to maintain the tapers seated during said continued advance of the movable support.

3. The combination as defined in claim 2 including an abutment limiting the retraction of said bushing to a predetermined position under the force of said biasing means.

4. The combination as defined in claim 1 in which said tapers disengage from each other automatically during retraction of said movable support after said continued advance.

5. The combination as defined in claim 1 in which said movable support is advanced at a rapid rate to bring tapers into seating engagement and then at reduced feed rate during said continued advance.

6. The combination as defined in claim 1 including elements arranged on the interior of said bushing and the exterior of said spindle to interengage during the advance and retraction of said movable support and provide supplemental and positive coupling of the spindle and bushing during said continued spindle advance.

7. The combination as defined in claim 6 in which said elements operate automatically as an incident to interengagement with each other and advance of said spindle to turn said spindle to and maintain the same in a predetermined angular position.

8. The combination as defined in claim 6 in which said elements comprise a key rigid with the interior of said bushing and a slot along said spindle open at one end to receive the key.

9. The combination of two supports mounted for relative movement back and forth along a straight path through a predetermined range, a power rotated spindle mounted cantilever fashion on the movable one of said supports and projecting therefrom along said path, two bushings alined axially and spaced along the other support each for receiving said spindle in telescoped relation, hydrostatic bearings on said other support surrounding said bushings and supporting the same for rotation about and for axial movement along a precisely located axis, means for relatively moving said supports along said path to correspondingly and initially advance the spindle and bushings relative to each other, complemental pairs of tapers on said spindle and within said bushings positioned for abutting engagement when said movable support reaches a predetermined position in the advance of said movable support, and independent means on said other support biasing each of said bushings in a direction opposite to said advance whereby to maintain both of said pairs of tapers seated during said continued advance.

10. For use in boring a hole in a workpiece disposed between rotary first and second bearing sleeves alined axially with the hole and biased axially in one direction, each of said sleeves having an internal frusto-conical surface converging axially in the opposite direction, a boring tool comprising an elongated bar adapted to be mounted cantilever fashion and to be inserted axially in said opposite direction successively through said first sleeve, the work bore and into said second sleeve to a predetermined position, external frusto-conical tapers axially spaced along said bar and adapted for mating engagement with the said conical sleeve surfaces on the respective sleeves when said bar reaches said position, and a cutting tooth projecting laterally from said bar between said tapers so as to be disposed short of said work hole when the bar reaches said predetermined position, said tooth being adapted to enlarge said work hole during feeding of the bar beyond said position and axial yielding of the sleeves while supporting the bar through the medium of said tapers.

11. A boring tool as defined in claim 10 including radially disposed surfaces spaced along the bar for engagement with coacting surfaces on the respective sleeves to couple the bar and the sleeves as the bar reaches said predetermined position and thereby couple the bar and sleeve positively for rotation in unison during the boring of the work hole.

References Cited

UNITED STATES PATENTS

| | | | |
|---|---|---|---|
| 2,432,943 | 12/1947 | Shaw | 77—57 |
| 2,643,554 | 6/1953 | Sperisen | 77—3 |
| 2,671,700 | 3/1954 | Seyffret | 308—9 |
| 3,189,389 | 6/1965 | Heer | 308—9 |
| 3,244,028 | 4/1966 | Dever et al. | 77—1 |
| 3,382,739 | 5/1968 | Jacobson | 77—56 |

GERALD A. DOST, *Primary Examiner.*

U.S. Cl. X.R.

77—1, 57; 82—30; 90—11; 308—5, 9